United States Patent
Jin et al.

(10) Patent No.: US 12,461,884 B2
(45) Date of Patent: Nov. 4, 2025

(54) SERIAL INTERFACE RECEIVER AND OFFSET CALIBRATION METHOD THEREOF

(71) Applicant: Samsung Electronics Co., Ltd., Suwon-si (KR)

(72) Inventors: Jahoon Jin, Suwon-si (KR); Kyunghwan Min, Suwon-si (KR); Sangho Kim, Suwon-si (KR); Hyoungjoong Kim, Suwon-si (KR); Soomin Lee, Suwon-si (KR); Sodam Ju, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 29 days.

(21) Appl. No.: 18/458,332

(22) Filed: Aug. 30, 2023

(65) Prior Publication Data

US 2024/0303214 A1   Sep. 12, 2024

(30) Foreign Application Priority Data

Mar. 8, 2023   (KR) .................. 10-2023-0030648

(51) Int. Cl.
*G06F 13/42* (2006.01)
*H03K 5/24* (2006.01)

(52) U.S. Cl.
CPC ........... *G06F 13/4282* (2013.01); *H03K 5/24* (2013.01); *G06F 2213/0002* (2013.01)

(58) Field of Classification Search
CPC ........ G06F 13/4282; G06F 2213/0002; H03K 5/24
See application file for complete search history.

(56) References Cited

U.S. PATENT DOCUMENTS

| | | | |
|---|---|---|---|
| 6,885,236 B2 | 4/2005 | Vorenkamp | |
| 7,188,263 B1 | 3/2007 | Rubinstein et al. | |
| 7,814,359 B2 | 10/2010 | Bae et al. | |
| 8,476,971 B2 | 7/2013 | Peng et al. | |
| 8,559,558 B2 | 10/2013 | Hollis | |
| 9,244,477 B2 | 1/2016 | Dimitriu et al. | |
| 9,525,571 B2 | 12/2016 | Ruberg et al. | |
| 9,673,849 B1* | 6/2017 | Paraschou | ............... H04B 1/76 |
| 9,806,918 B1* | 10/2017 | Su | .................... H04L 25/03146 |
| 10,873,444 B2 | 12/2020 | Manian et al. | |
| 11,221,638 B2 | 1/2022 | Tesch | |

(Continued)

FOREIGN PATENT DOCUMENTS

KR   100870536 B1   11/2008

*Primary Examiner* — Henry Tsai
*Assistant Examiner* — Harry Z Wang
(74) *Attorney, Agent, or Firm* — Harness, Dickey & Pierce, P.L.C.

(57) ABSTRACT

Disclosed is a receiver of a serial interface, comprising, a first multiplexer configured to select one of a data signal and a first reference voltage in response to an enable signal, a second multiplexer configured to select one of the first reference voltage and a second reference voltage in response to the enable signal, a comparator receiving an output of the first multiplexer to a positive input terminal and an output of the second multiplexer to a negative input terminal, and a reference generator configured to generate the second reference voltage and to generate the first reference voltage from the second reference voltage using an unity gain buffer.

19 Claims, 14 Drawing Sheets

(56) References Cited

U.S. PATENT DOCUMENTS

| | | |
|---|---|---|
| 2011/0068758 A1 | 3/2011 | Chiu |
| 2011/0204924 A1* | 8/2011 | Nguyen ........... G01R 19/16552 |
| | | 327/73 |
| 2012/0086494 A1* | 4/2012 | Asada ................... H03L 7/0807 |
| | | 327/307 |
| 2016/0341604 A1* | 11/2016 | Kosonocky ............ G01K 13/00 |
| 2023/0421168 A1* | 12/2023 | Iqbal .................... H03M 1/462 |

* cited by examiner

FIG. 6

| Normal mode | | | | Offset Calibration mode | | | |
|---|---|---|---|---|---|---|---|
| MUX1 | | MUX2 | | MUX1 | | MUX2 | |
| SW1 | SW2 | SW3 | SW4 | SW1 | SW2 | SW3 | SW4 |
| ON | OFF | OFF | ON | OFF | ON | ON | OFF |

SERIAL INTERFACE RECEIVER AND OFFSET CALIBRATION METHOD THEREOF

CROSS-REFERENCE TO RELATED APPLICATIONS

This application claims priority under 35 U.S.C. § 119 to Korean Patent Application No. 10-2023-0030648 filed on Mar. 8, 2023, in the Korean Intellectual Property Office, the disclosures of which are incorporated by reference herein in their entireties.

BACKGROUND

Embodiments of the present disclosure described herein relate to a semiconductor device, and more particularly, to a serial interface receiver configured to provide a stable reference voltage and a calibration method thereof.

With the rapid supply of mobile devices and the rapid increase in the amount of Internet access, the demand for high-capacity and high-speed data transmission is increasing day by day. Recently, a pulse amplitude modulation ("PAM"), one of serial communication scheme, has been actively researched as an alternative to a signal method for high-capacity and high-speed data transmission.

In such serial communication schemes, an offset calibration function to provide signal integrity in a high-speed interface receiver is essential. To apply offset calibration, the same voltage must be applied to both input terminals of the comparator. Therefore, a means for selectively inputting the data DQ and the reference voltage VREF (e.g., Multiplex: hereinafter, MUX) is used at the input terminal of the comparator. To secure bandwidth for high-speed operation, a super low threshold voltage SLVT switch and/or a low threshold voltage LVT switch is used in the MUX. However, the super low threshold voltage SLVT switch and/or the low threshold voltage LVT switch may cause a leakage current to occur, which affects the stability of the reference voltage VREF. In a multi-lane receiver that receives a plurality of serial signals, the magnitude of leakage current inevitably increases as the number of lanes increases. Accordingly, in a multi-lane receiver, there is a problem in that an error probability due to the instability of the reference voltage VREF increases.

SUMMARY

Embodiments of the present disclosure provide a stable reference voltage by blocking leakage current in a serial interface receiver and an offset calibration method that mitigates and/or blocks the effect of leakage current in a serial interface receiver.

According to at least one embodiment, a receiver of a serial interface, comprising, a first multiplexer configured to select one of a data signal or a first reference voltage based on an enable signal; a second multiplexer configured to select one of the first reference voltage or a second reference voltage based on the enable signal; a comparator including a positive input terminal and a negative input terminal, the comparator configured to receive an output of the first multiplexer through the positive input terminal and an output of the second multiplexer through the negative input terminal; and a reference generator configured to generate the second reference voltage and to generate, using a unity gain buffer, the first reference voltage from the second reference voltage.

According to at least one embodiment, a serial interface receiver, comprising, a multiplexer configured to select one of a data signal or a buffer reference voltage based on an enable signal; a comparator including a positive input terminal and a negative input terminal, the comparator configured to receive an output of the multiplexer through the positive input terminal and to receive the buffer reference voltage through the negative input terminal; and a reference generator configured to generate a reference voltage and to generate, using a unity gain buffer, the buffer reference voltage from a voltage following the reference voltage.

According to at least one embodiment, a method for calibrating an offset of a high-speed serial interface receiver, wherein the high-speed serial interface receiver includes a first multiplexer configured to select one of a data signal or a first reference voltage and to provide the selected one of the data signal or the first reference voltage to a positive input terminal of a comparator, a second multiplexer configure to select one of the first reference voltage or a second reference voltage and to provide the selected one of the first reference voltage or the second reference voltage to a negative input terminal of the comparator, and a reference generator configure to provide the first reference voltage and the second reference voltage, the method comprising: generating at least one of the first reference voltage or the second reference voltage by dividing a power supply voltage; activating an offset calibration enable signal such that the high-speed serial interface receiver enters an offset calibration mode, and the first multiplexer and the second multiplexer select the first reference voltage; and performing an offset calibration operation, in which the first reference voltage is supplied to the positive input terminal and the negative input terminal of the comparator.

BRIEF DESCRIPTION OF THE FIGURES

The above and other objects and features of the present disclosure will become apparent by describing in detail embodiments thereof with reference to the accompanying drawings.

FIG. 6 is a table briefly showing switch states of multiplexers.

DETAILED DESCRIPTION

Hereinafter, some example embodiments of the present invention will be described with reference to the accompanying drawings in order to describe in detail enough for those skilled in the art to easily implement the technical idea of the present invention. Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Figure 1:
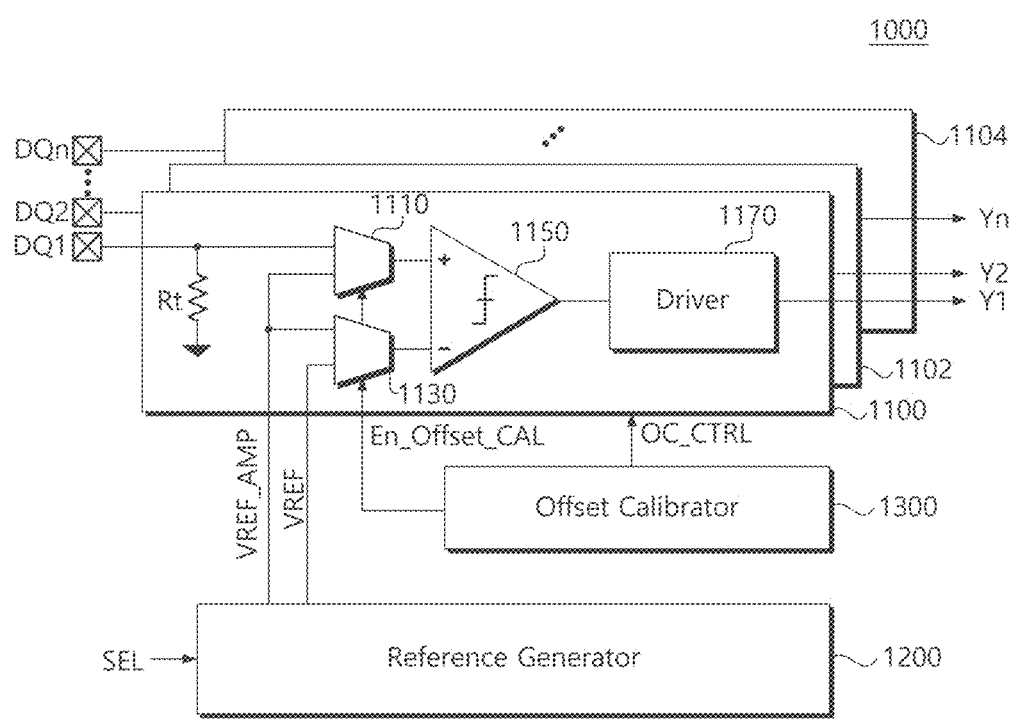
FIG. 1 is a block diagram showing a receiver of a serial interface according to at least one embodiment of the present invention.

FIG. 1 is a block diagram showing a receiver of a serial interface according to at least one embodiment of the present invention. Referring to FIG. 1, a receiver 1000 may include a plurality of data lanes 1100, 1102, . . . , 1104, a reference generator 1200, and an offset calibrator 1300.

The plurality of data lanes 1100, 1102, . . . , 1104 are configured to receive externally transmitted data signals DQ1, DQ2, . . . , DQn using the reference voltage VREF. Each of the plurality of data lanes 1100, 1102, . . . , 1104 compares each of the data signals DQ1, DQ2, . . . , DQn with the reference voltage VREF to decide either a high level or a low level. The data Y1, Y2, . . . , Yn determined in the plurality of data lanes 1100, 1102, . . . , 1104 will be transferred to components for processing the data.

Each of the plurality of data lanes 1100, 1102, . . . , 1104 is configured to switch between and operate in a normal mode (e.g., for receiving the data signals DQ1, DQ2, . . . , DQn) or in an offset calibration mode (e.g., for adjusting the offset of the comparator 1150). For example, in the normal mode, each of the plurality of data lanes 1100, 1102, . . . , 1104 compares the reference voltage VREF provided from the reference generator 1200 with the data signals DQ1, DQ2, . . . , DQn to identify the transmitted data; and, in the offset calibration mode, each of the plurality of data lanes 1100, 1102, . . . , 1104 performs a calibration operation of the comparator 1150 in response to the calibration enable signal En_Offset_CAL provided from the offset calibrator 1300. Hereinafter, a description of the data lanes 1100, 1102, . . . , 1104 will be replaced by a description of the configuration and function of single data lane 1100 for brevity. This is because the configuration and function of each of the plurality of data lanes 1100, 1102, . . . , 1104 are substantially similar and/or the same.

The data lane 1100 may include a termination resistor Rt, multiplexers 1110 and 1130, a comparator 1150, and a driver 1170. The termination resistor Rt may be provided with a size for defining the input impedance of the receiver 1000. The multiplexers 1110 and 1130 are configured to select the input signal of the comparator 1150 according to the mode. For example, in the normal mode, the first multiplexer 1110 transfers the data signal DQ1 input to the positive input terminal (+) of the comparator 1150; and the second multiplexer 1130 transfers the reference voltage VREF provided from the reference generator 1200 to the negative input terminal (−) of the comparator 1150. Then, the comparator 1150 determines the level of the data signal DQ1 based on the reference voltage VREF, and transfers it to the driver 1170. The driver 1170 outputs data Y1 according to the determination result of the comparator 1150.

The data signals DQ1, DQ2, . . . , DQn transmitted according to the high-speed interface method include high-frequency components. Therefore, although a high transmission speed can be provided by the high-speed data signals DQ1, DQ2, . . . , DQn, switching elements vulnerable to leakage current must be used for the multiplexers 1110 and 1130. For example, to secure a bandwidth for high-speed operation, super low threshold voltage SLVT or low threshold voltage LVT switches are used in the multiplexers 1110 and 1130. Due to this, the reference generator 1200 is inevitably affected by the leakage current of the multiplexers 1110 and 1130. In the present invention, by using the buffer reference voltage VREF_AMP generated using a unity gain buffer, the influence of the leakage current flowing into the reference generator 1200 is mitigated and/or blocked.

In the offset calibration mode, each of the multiplexers 1110 and 1130 provides the buffer reference voltage VREF_AMP to the positive input terminal (+) and negative input terminal (−) of the comparator 1150. The first multiplexer 1110 selects the buffer reference voltage VREF_AMP in response to the calibration enable signal En_Offset_CAL provided from the offset calibrator 1300. The second multiplexer 1130 applies the buffer reference voltage VREF_AMP provided from the reference generator 1200 to the negative input terminal (−) of the comparator 1150 in response to the calibration enable signal En_Offset_CAL provided from the offset calibrator 1300. Based on the aforementioned buffer reference voltage VREF_AMP, the offset calibrator 1300 may perform an offset calibration operation for adjusting the offset of the comparator 1150.

Reference generator 1200 can generate two distinct reference voltages. For example, the reference generator 1200 may provide the reference voltage VREF used to determine the data signal DQj (wherein "j" is a natural number) in the normal mode; and, in the offset calibration mode, the reference generator 1200 provides the buffer reference voltage VREF_AMP used for calibration of the comparator 1150. In at least one embodiment, the buffer reference voltage VREF_AMP is generated from a voltage follower circuit configured to use an operational amplifier (at the output terminal of the reference generator 1200) and/or a unity gain buffer. Therefore, even if leakage current flows into the reference generator 1200, it can be blocked by the unity gain buffer or the voltage follower. In at least one embodiment, the buffer reference voltage VREF_AMP has the same magnitude as the reference voltage VREF, but can be considered as having an independent output node.

In the above, the structure of the receiver 1000 according to at least one embodiment of the present invention has been briefly described. The reference generator 1200 of the present invention generates the buffered reference voltage VREF_AMP using the unity-gain buffer or the voltage follower. In addition, an offset calibration mode of the data lanes 1100, 1102, . . . , 1104 may be executed using the buffer reference voltage VREF_AMP. Accordingly, reliability of the offset calibration mode of the receiver 1000 may be improved as the instability of the reference voltage due to the leakage current is resolved.

Figure 2:
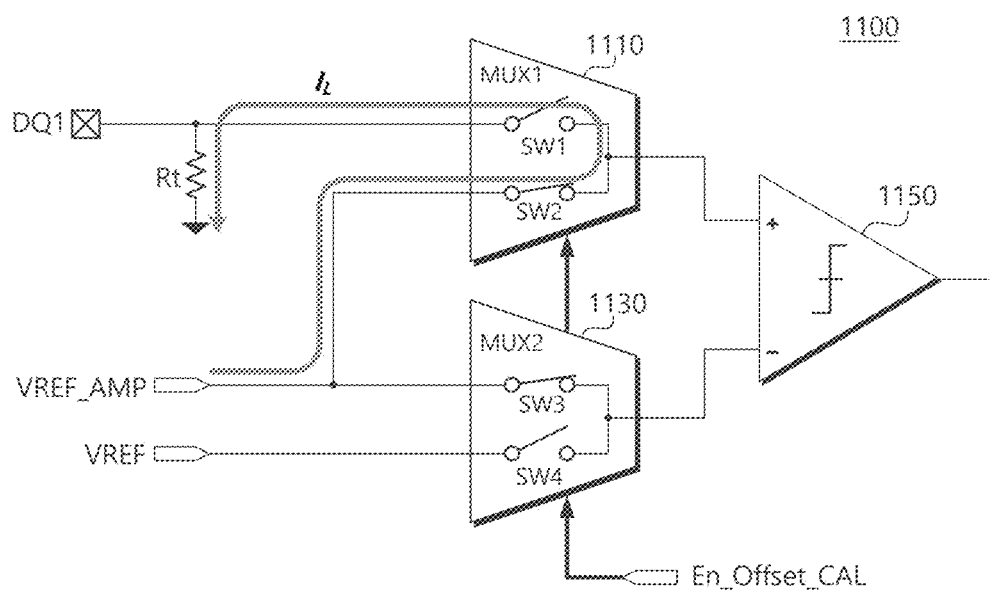
FIG. 2 is a circuit diagram showing multiplexers and comparators constituting the data lane of FIG. 1 in more detail.

FIG. 2 is a circuit diagram showing multiplexers and comparators constituting the data lane of FIG. 1 in more detail. Referring to FIG. 2, the multiplexers 1110 and 1130 may provide the data signal DQ1 and the reference voltage VREF in the normal mode and the buffer reference voltage VREF_AMP in the offset calibration mode to the comparator 1150.

For example, the first multiplexer 1110 is configured to select one of the data signal DQ1 and the buffer reference voltage VREF_AMP and transfer the selected one to the positive input terminal (+) of the comparator 1150. In at least one embodiment, the first multiplexer 1110 may include a first switch SW1 for switching the data signal DQ1 and a second switch SW2 for switching the buffer reference voltage VREF_AMP. For example, the first switch SW1 may be implemented as a very low threshold voltage SLVT switch or a low threshold voltage LVT switch configured to switch the high-speed data signal DQ1. In this case, leakage current may exist in the first switch SW1, even in a turned-off state, due to device characteristics. Accordingly, when the first switch SW1 is turned off and the second switch SW2 is turned on in the offset calibration mode, a leakage current $I_L$ path may be generated as shown. When leakage current $I_L$ is generated, it affects the reference generator 1200. Therefore, stable operation of the reference generator 1200 cannot be guaranteed due to the leakage current $I_L$.

However, when the offset calibration mode is executed using the buffer reference voltage VREF_AMP, the influence of the leakage current $I_L$ on the reference generator 1200 is mitigated and/or blocked. This is because the buffer reference voltage VREF_AMP is the following voltage generated from the reference voltage VREF using the unity-gain buffer or voltage follower circuit. In other words, the influence of the leakage current $I_L$ on the circuit generating the reference voltage VREF may be blocked by the unity gain buffer. Therefore, it is possible to generate a stable buffer reference voltage VREF_AMP and reference voltage VREF even in the offset calibration mode. This mechanism will be described in more detail in FIG. 3 to be described later.

The second multiplexer 1130 selects one of the reference voltage VREF and the buffer reference voltage VREF_AMP and transfers it to the negative input terminal (−) of the comparator 1150. To this end, the second multiplexer 1130 may include a third switch SW3 for switching the buffer reference voltage VREF_AMP and a fourth switch SW4 for switching the reference voltage VREF.

In the normal mode in which the calibration enable signal En_Offset_CAL is deactivated, the second multiplexer 1130 is configured to transfer the reference voltage VREF to the negative input terminal (−) of the comparator 1150. Accordingly, in the normal mode, the third switch SW3 is turned off and the fourth switch SW4 is turned on. On the other hand, in the offset calibration mode in which the calibration enable signal En_Offset_CAL is activated, the second multiplexer 1130 is configured to transfer the buffer reference voltage VREF_AMP to the negative input terminal (−) of the comparator 1150. Accordingly, in the offset calibration mode, the third switch SW3 is turned on and the fourth switch SW4 is turned off.

The comparator 1150 compares the signal provided to the positive input terminal (+) with the signal provided to the negative input terminal (−) in the normal mode. The comparator 1150 outputs a high level H when the level of the signal provided to the positive input terminal (+) is higher than the level of the signal supplied to the negative input terminal (−). On the other hand, if the level of the signal provided to the positive input terminal (+) is lower than the level of the signal supplied to the negative input terminal (−), the comparator 1150 will output a low level L. However, in the offset calibration mode, the comparator 1150 adjusts the difference (or offset) between the signals provided to the positive input terminal (+) and the negative input terminal (−) to a target value (e.g., 0V).

In the data lane 1100 of the present invention, the influence of the leakage current $I_L$ generated in the first multiplexer 1110 in the offset calibration mode can be blocked. Since the buffer reference voltage VREF_AMP is generated using the unity-gain buffer, voltage fluctuations due to leakage current $I_L$ can be blocked. Therefore, even if leakage current $I_L$ is generated, the reference generator 1200 supplies a reliable voltage.

Figure 3:
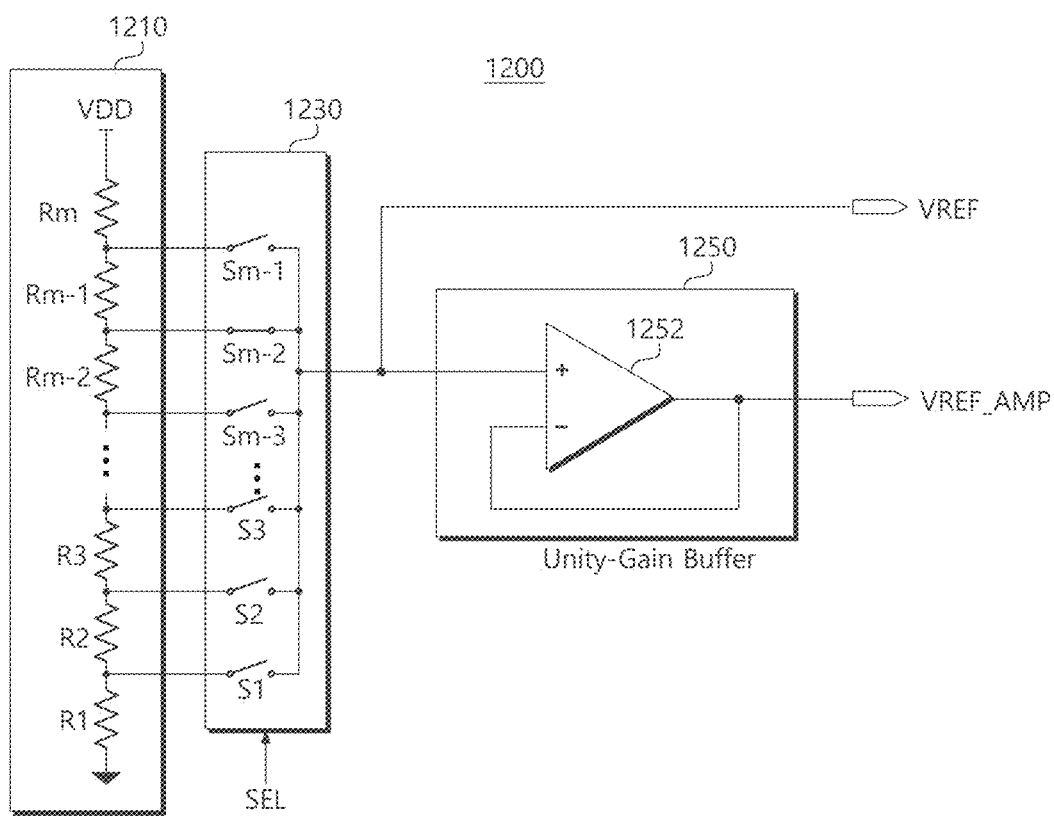
FIG. 3 is a circuit diagram showing the reference generator of FIG. 1 as an example.

FIG. 3 is a circuit diagram showing the reference generator 1200 of FIG. 1 as an example. Referring to FIG. 3, the reference generator 1200 includes a voltage divider resistor 1210, a switch stage 1230, and an unity gain buffer 1250.

The voltage divider resistor 1210 includes a plurality of resistors R1 to Rm connected in series between the power supply voltage VDD and the ground. The power supply voltage VDD is divided by the resistors R1 to Rm, and one of the divided voltages may be selected as the reference voltage VREF.

The switch stage 1230 includes a plurality of switches S1 to Sm-1 that select one of the voltages distributed by the plurality of resistors R1 to Rm. The selection signal SEL may turn on one of the plurality of switches S1 to Sm-1 and the remainder thereof may remain (and/or be) turned off. For example, if the voltage divided between the resistor Rm-1 and the resistor Rm-2 is selected as the reference voltage VREF, only the switch Sm-2 needs to be turned on as shown. Substantially, the reference voltage VREF is generated at the switch stage 1230.

The reference voltage VREF and the buffer reference voltage VREF_AMP are determined through the selection signal SEL input to the switch terminal 1230. For example, in order to receive a PAM4 signal, three different levels of reference voltage VREF must be provided. In this case, the receiver 1000 may select one of the three reference voltages VREF corresponding to the received signal using the selection signal SEL.

The unity gain buffer 1250 transfers the reference voltage VREF generated by the switch stage 1230 in a voltage follower method using an operational amplifier 1252. For example, the reference voltage VREF is input to the positive input terminal (+) of the operational amplifier 1252. Then, the buffer reference voltage VREF_AMP output at the same level as the reference voltage VREF is negatively fed back to the negative input terminal (−) of the operational amplifier 1252. Therefore, even if the leakage current flows through the output terminal of the buffer reference voltage VREF_AMP, it has little effect on the positive input terminal (+) of the operational amplifier 1252.

In the above, an example structure of the reference generator 1200 of the present invention has been briefly described, wherein the reference generator 1200 of the present invention uses the unity gain buffer 1250 using the operational amplifier 1252 to generate the buffer reference voltage VREF_AMP. Accordingly, the reference generator 1200 can generate the reference voltage VREF or the buffer reference voltage VREF_AMP at a stable level without being affected by leakage current that may occur in the first multiplexer 1110 in the offset calibration mode.

Figure 4:
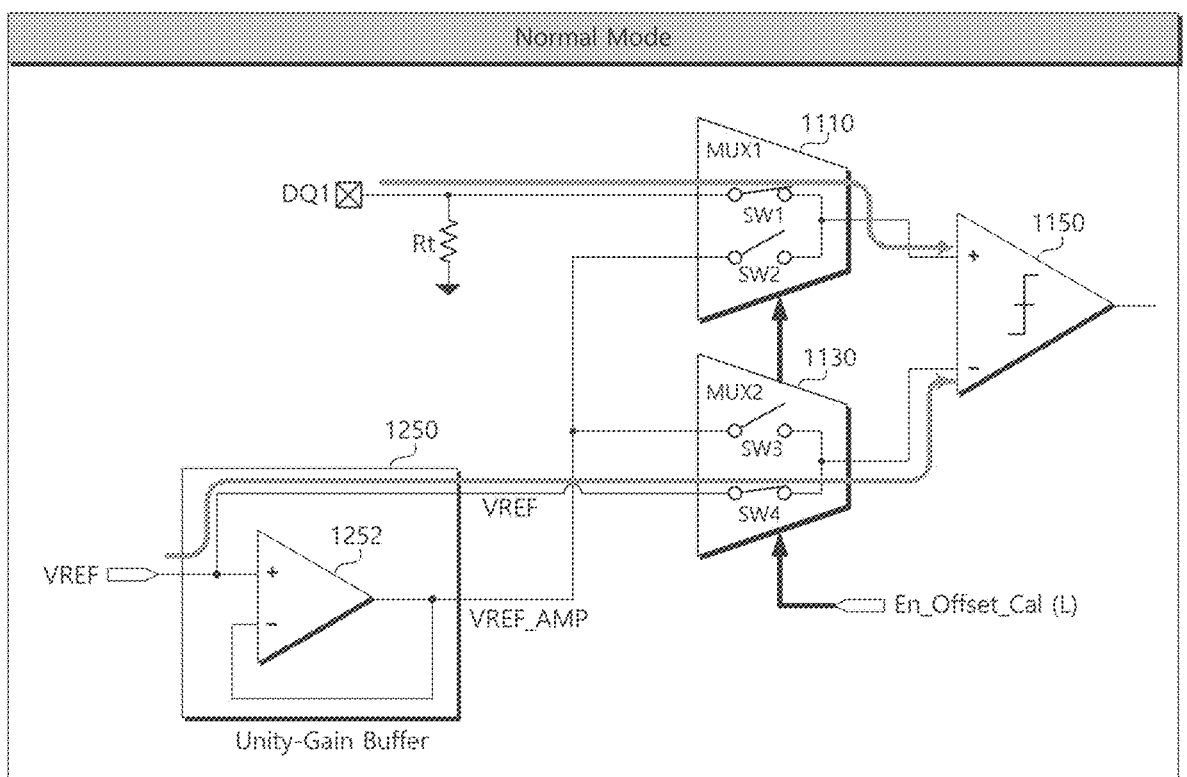
FIG. 4 is a circuit diagram showing switching states of multiplexers in normal mode operation of the receiver of the present invention.

FIG. 4 is a circuit diagram showing switching states of multiplexers in normal mode operation of the receiver of the present invention. Referring to FIG. 4, in normal mode, the multiplexers 1110 and 1130 transfer the data signal DQ1 and the reference voltage VREF to the comparator 1150.

The reference generator 1200 generates a reference voltage VREF and a buffer reference voltage VREF_AMP regardless of the mode. As described above, the reference voltage VREF is generated by the voltage divider resistor 1210 and the switch terminal 1230. Also, the buffer reference voltage VREF_AMP is generated from the reference voltage VREF through the unity gain buffer 1250. As a result, the unity gain buffer 1250 maintains the buffer reference voltage VREF_AMP and the reference voltage VREF at the same level, but may provide an effect of separating the output node. The reference voltage VREF and the buffer reference voltage VREF_AMP are always transferred to the multiplexers 1110 and 1130.

In the normal mode of receiving the data signal DQ1, the offset calibrator 1300 deactivates the calibration enable signal En_Offset_CAL. Then, as shown, the first switch SW1 of the first multiplexer 1110 is turned on (and the second switch SW2 is turned off). Also, the fourth switch SW4 is turned on (and the third switch SW3 of the second multiplexer 1130 is turned off). Consequently, in the normal mode, the data signal DQ1 may be transferred to the positive input terminal (+) of the comparator 1150, and the reference voltage VREF may be transferred to the negative input terminal (−) of the comparator 1150. Then, the logic value of the data signal DQ1 may be determined by the comparator 1150.

Figure 5:
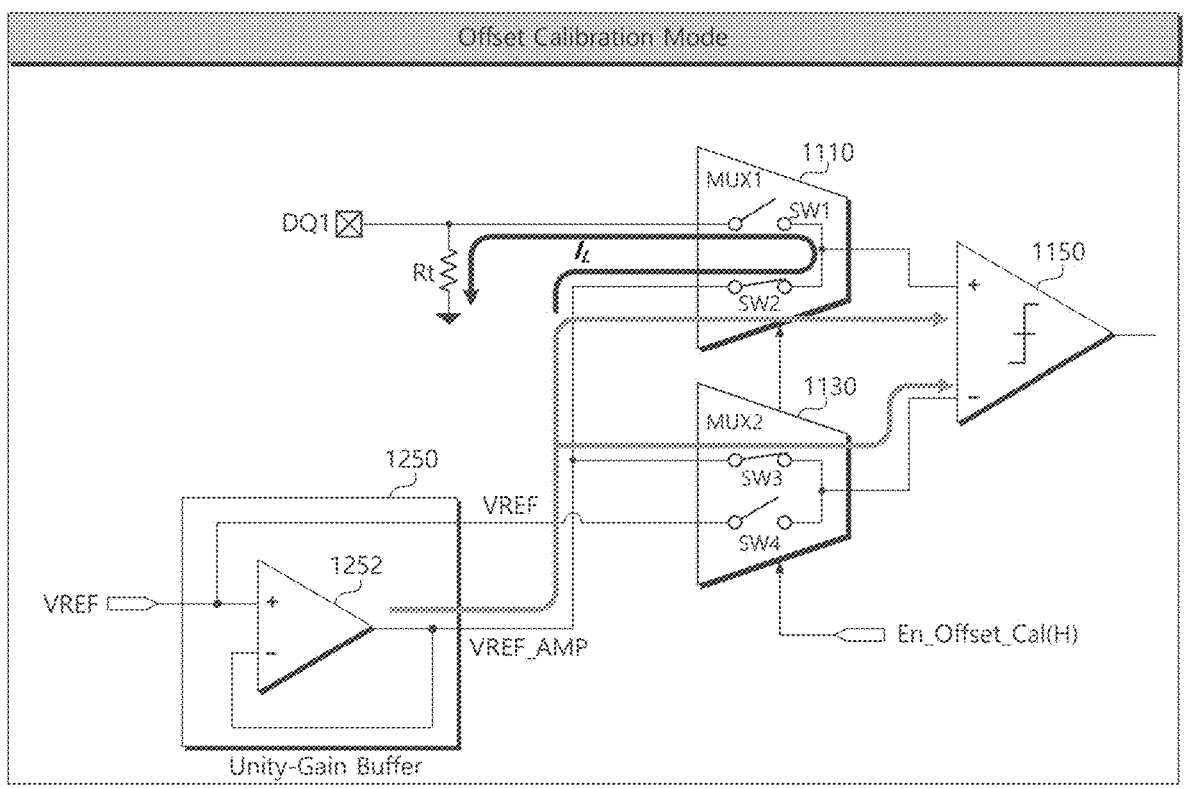
FIG. 5 is a circuit diagram showing switching states of multiplexers in an offset calibration mode of a receiver.

FIG. 5 is a circuit diagram showing switching states of multiplexers in an offset calibration mode of a receiver. Referring to FIG. 5, in the offset calibration mode, the multiplexers 1110 and 1130 select a buffer reference voltage VREF_AMP and transfer it to the comparator 1150.

The reference generator 1200 generates a reference voltage VREF and a buffer reference voltage VREF_AMP. The reference voltage VREF is generated by the voltage divider resistor 1210 and the switch stage 1230. Also, the buffer reference voltage VREF_AMP may be generated through the unity gain buffer 1250. As a result, the unity gain buffer 1250 maintains the buffer reference voltage VREF_AMP and the reference voltage VREF at the same level, but may provide an effect of separating output nodes. As such, during both the normal and offset calibration modes, the reference voltage VREF and the buffer reference voltage VREF_AMP are both (e.g., always) transferred to the multiplexers 1110 and 1130.

In the offset calibration mode, the calibration enable signal En_Offset_CAL provided from the offset calibrator 1300 is activated (or high). Then, as shown, the first switch SW1 of the first multiplexer 1110 is turned off and the second switch SW2 is turned on. Also, the third switch SW3 of the second multiplexer 1130 is turned on, and the fourth switch SW4 is turned off. As a result, in the offset calibration mode, the buffer reference voltage VREF_AMP is transmitted to both the positive input terminal (+) and negative input terminal (−) of the comparator 1150 by the multiplexers 1110 and 1130. Then, the offset calibrator 1300 may adjust the offset of the comparator 1150 to an optimal (or otherwise desired) value based on the buffer reference voltage VREF_AMP.

In addition, the first switch SW1 may be provided as a very low threshold voltage SLVT switch or a low threshold voltage LVT switch configured to switch to the high-speed data signal DQ1. In this case, leakage current $I_L$ may exist in the first switch SW1 due to device characteristics even in a turned-off state. Accordingly, when the first switch SW1 is turned off and the second switch SW2 is turned on in the offset calibration mode, a leakage current $I_L$ path may be formed.

However, when the offset calibration mode is applied using the buffer reference voltage VREF_AMP of the present invention, the influence of the leakage current $I_L$ on the reference generator 1200 can be mitigated and/or blocked. This is because the buffer reference voltage VREF_AMP is generated in a voltage following method by applying the unity gain buffer 1250. Since the output terminal of the operational amplifier 1252 is negatively fed back to the negative input terminal (−), the reference voltage VREF can maintain a stable level regardless of the leakage current $I_L$.

As a result, the reference generator 1200 of the present invention can stably generate the buffer reference voltage VREF_AMP and the reference voltage VREF by the unity gain buffer 1250 even in the offset calibration mode.

FIG. 6 is a table briefly showing switch states of multiplexers. Referring to FIG. 6, the multiplexers 1110 and 1130 have different switching states according to modes according to the calibration enable signal En_Offset_CAL provided from the offset calibrator 1300.

In the normal mode, the offset calibrator 1300 deactivates the calibration enable signal En_Offset_CAL to a low level 'L'. Then, the first switch SW1 of the first multiplexer 1110 is turned on, and the second switch SW2 is turned off. Also, the third switch SW3 of the second multiplexer 1130 is turned off and the fourth switch SW4 is turned on. Due to this switching state, in the normal mode, the data signal DQ1 may be transferred to the positive input terminal (+) of the comparator 1150, and the reference voltage VREF may be transferred to the negative input terminal (−) of the comparator 1150. Then, the comparator 1150 may determine a logic value of the data signal DQ1 by comparing the data signal DQ1 with the reference voltage VREF.

In the offset calibration mode, the calibration enable signal En_Offset_CAL provided from the offset calibrator 1300 is activated at a high level 'H'. Then, the first switch SW1 of the first multiplexer 1110 is turned off, the second switch SW2 is turned on, the third switch SW3 of the second multiplexer 1130 is turned on, and the fourth switch SW4 is turned off. In the offset calibration mode, the buffer reference voltage VREF_AMP is delivered to both the positive input terminal (+) and the negative input terminal (−) of the comparator 1150 by the multiplexers 1110 and 1130. Then, the offset calibrator 1300 may adjust the offset of the comparator 1150 to an optimal value based on the buffer reference voltage VREF_AMP.

In addition, in the offset calibration mode, the first switch SW1 may be provided as a very low threshold voltage SLVT switch or a low threshold voltage LVT switch configured to switch to the high-speed data signal DQ1. In this case, leakage current $I_L$ may exist in the first switch SW1 due to device characteristics even in a turned-off state. However, when the offset calibration mode is executed using the buffer reference voltage VREF_AMP, the influence of the leakage current $I_L$ on the reference generator 1200 can be mitigated and/or blocked. This is because the buffer reference voltage VREF_AMP is generated using a unity-gain buffer 1250 (see FIG. 5) for the reference voltage VREF. The influence of the leakage current $I_L$ on the circuit generating the reference voltage VREF may be blocked by the unity gain buffer 1250. Therefore, it is possible to generate a stable buffer reference voltage VREF_AMP and reference voltage VREF even in the offset calibration mode.

Figure 7:
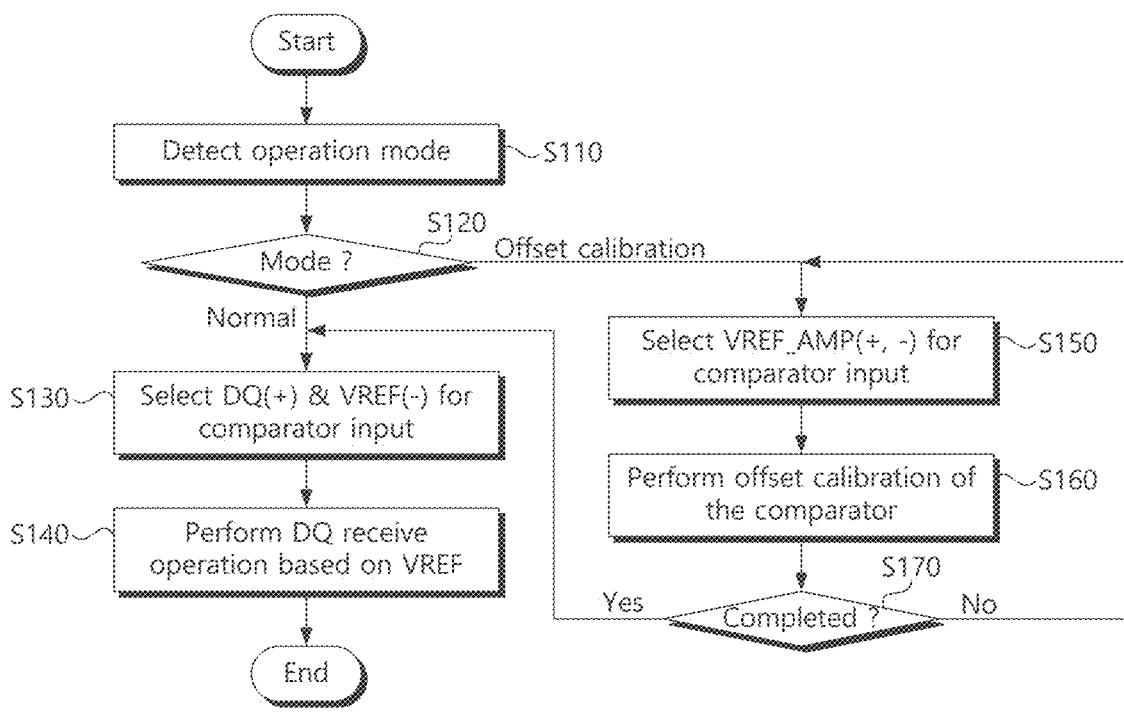
FIG. 7 is a flowchart briefly illustrating the operation of a receiver for each mode according to at least one embodiment of the present invention.

FIG. 7 is a flowchart briefly illustrating the operation of a receiver for each mode according to at least one embodiment of the present invention. Referring to FIG. 7, the receiver 1000 of the present invention selects the reference voltage VREF and the buffer reference voltage VREF_AMP as inputs of the comparator 1150 according to the mode, thereby blocking the influence of the leakage current $I_L$.

In step S110, the receiver 1000 monitors the operation mode. For example, when the receiver is in an initialization state due to a power-on sequence or reset, the receiver 1000 must apply the offset calibration mode. On the other hand, the general operation of receiving the data signal DQj is a normal mode. In at least one embodiment, the receiver 1000 may be connected to and/or include processing circuitry configured to monitor the operation mode and/or to control the operation of the receiver 1000. For example, the processing circuitry, more specifically, may include (and/or be included in), but is not limited to, a processor, a Central Processing Unit (CPU), a controller, an Arithmetic Logic Unit (ALU), a digital signal processor, a microcomputer, a Field Programmable Gate Array (FPGA), a System-on-Chip (SoC), a programmable logic unit, a microprocessor, Application-specific Integrated Circuit (ASIC), semiconductor elements in an integrated circuit, circuits enrolled as an Intellectual Property (IP), etc.

In step S120, an operation branch according to the mode of the receiver 1000 occurs. If in the normal mode, the procedure moves to step S130; and, in case of the offset calibration mode, the procedure moves to step S150.

In step S130, the offset calibrator 1300 deactivates the calibration enable signal En_Offset_CAL to a low level 'L'. At this time, the first switch SW1 of the first multiplexer 1110 is turned on, and the second switch SW2 is turned off. Then, the data signal DQ1 is transferred to the positive input terminal (+) of the comparator 1150. Also, the third switch SW3 of the second multiplexer 1130 is turned off and the fourth switch SW4 is turned on. Then, the reference voltage VREF is transferred to the negative input terminal (−) of the comparator 1150.

In step S140, the comparator 1150 compares the data signal DQ1 input through the positive input terminal (+) with the reference voltage VREF input through the negative input terminal (−) to determine the logic value of the data signal DQ1.

In step S150, the calibration enable signal En_Offset_CAL provided from the offset calibrator 1300 is activated to a high level 'H' to execute the offset calibration mode. The first switch SW1 of the first multiplexer 1110 is turned off and the second switch SW2 is turned on by the calibration enable signal En_Offset_CAL. Then, the buffer reference voltage VREF_AMP is transferred to the positive input terminal (+) of the comparator 1150. Also, the third switch SW3 of the second multiplexer 1130 is turned on, and the fourth switch SW4 is turned off. The buffer reference voltage VREF_AMP is also transferred to the negative input terminal (−) of the comparator 1150. That is, in the offset calibration mode, the buffer reference voltage VREF_AMP is transmitted to both the positive input terminal (+) and the negative input terminal (−) of the comparator 1150 by the multiplexers 1110 and 1130.

In step S160, the offset calibrator 1300 adjusts the offset of the comparator 1150 to an optimal value based on the buffer reference voltage VREF_AMP. Since the offset calibration procedure by the offset calibrator 1300 is a technical matter outside the features of the present invention, a detailed description thereof will be omitted.

In step S170, the receiver 1000 determines whether the offset calibration mode has been completed. If it is determined that the offset calibration mode is completed ('Yes' direction), the process moves to step S130 and the reception operation of the data signal DQ is started. Alternatively, the receiver 1000 may perform another setting mode to be additionally performed after the offset calibration mode. However, if it is determined that the offset calibration mode has not been completed ('No' direction), the procedure moves to step S150 to continue the offset calibration mode.

In the above, the operation method of the multiplexers 1110 and 1130 and the comparator 1150 according to the operation mode of the receiver 1000 of the present invention has been described. In particular, by executing the offset calibration mode using the buffer reference voltage VREF_AMP, the receiver 1000 can block the influence of leakage current.

Figure 8:
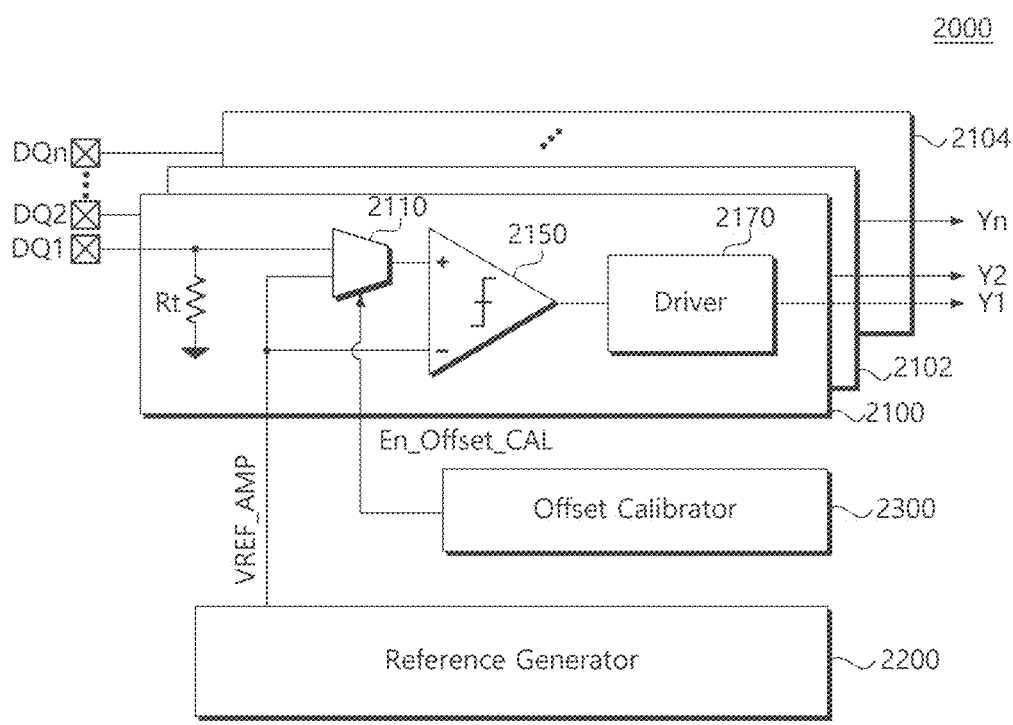
FIG. 8 is a block diagram showing a serial interface receiver according to at least one embodiment of the present invention.

FIG. 8 is a block diagram showing a serial interface receiver according to at least one embodiment of the present invention. Referring to FIG. 8, a receiver 2000 may include a plurality of data lanes 2100, 2102, . . . , 2104, a reference generator 2200, and an offset calibrator 2300. Each of the plurality of data lanes 2100, 2102, . . . , 2104 may receive a data signal and perform offset calibration using the buffer reference voltage VREF_AMP regardless of the mode.

The plurality of data lanes 2100, 2102, . . . , 2104 sample externally transmitted data signals DQ1, DQ2, . . . , DQn using the buffer reference voltage VREF_AMP. Each of the plurality of data lanes 2100, 2102, . . . , 2104 compares each of the data signals DQ1, DQ2, . . . , DQn with the buffer reference voltage VREF_AMP to determine either a high level 'H' or a low level 'L'. And the determined data Y1, Y2, . . . , Yn will be delivered to components for processing the data.

Each of the plurality of data lanes 2100, 2102, . . . , 2104 is configured to switch between and operate in a normal mode (for receiving the data signals DQ1, DQ2, . . . , DQn) or an offset calibration mode (for adjusting the offset of the comparator 2150). In the normal mode, each of the plurality of data lanes 2100, 2102, . . . , 2104 compares the buffer reference voltage VREF_AMP provided from the reference generator 2200 with the data signals DQ1, DQ2, . . . , DQn to identify transmitted data; and, in the offset calibration mode, each of the plurality of data lanes 2100, 2102, . . . , 2104 performs a calibration operation of the comparator 2150 in response to the control signal En_Offset_CAL provided from the offset calibrator 2300. Hereinafter, a description of the data lanes 2102, . . . , 2104 will be replaced with a description of the configuration and function of one data lane 2100. This is because the configuration and function of each of the plurality of data lanes 2100, 2102, . . . , 2104 are substantially the same.

The data lane 2100 may include a termination resistor Rt, a multiplexer 2110, a comparator 2150, and a driver 2170. The termination resistor Rt may be provided in a size to define the input impedance of the receiver 2000. The multiplexer 2110 selects the input signal of the comparator 2150 according to the mode.

In the normal mode, the multiplexer 2110 transfers the data signal DQ1 input to the positive input terminal (+) of the comparator 2150. Then, the comparator 2150 determines the level of the data signal DQ1 based on the buffer reference voltage VREF_AMP, and transfers it to the driver 2170. The driver 2170 outputs data Y1 according to the determination result of the comparator 2150.

In the offset calibration mode, the multiplexer 2110 provides the buffer reference voltage VREF_AMP to the positive input terminal (+) of the comparator 2150. Accordingly, in the offset calibration mode, the comparator 2150 may receive the buffer reference voltage VREF_AMP through both input terminals. For example, the multiplexer 2110 may select the buffer reference voltage VREF_AMP in response to activation of the calibration enable signal En_Offset_CAL. During the operation of the receiver 2000, the buffer reference voltage VREF_AMP provided from the reference generator 2200 is always input to the negative input terminal (−) of the comparator 1150. Based on the aforementioned buffer reference voltage VREF_AMP, the offset calibrator 2300 may perform an offset calibration operation for adjusting the offset of the comparator 2150.

The reference generator 2200 may generate a buffer reference voltage VREF_AMP. The reference generator 2200 may provide the buffer reference voltage VREF_AMP in both a normal mode and an offset calibration mode. The buffer reference voltage VREF_AMP is generated from an unity gain buffer using an operational amplifier formed at the output terminal of the reference generator 2200. Therefore, even if the leakage current $I_L$ flows into the reference generator 2200, it can be mitigated or blocked by the unity gain buffer.

In the above, the structure of the receiver 2000 according to at least one embodiment of the present invention has been briefly described. The reference generator 2200 of the present invention generates a buffer reference voltage VREF_AMP using a unity gain buffer. The data lanes 2100, 2102, . . . , 2104 may execute a data sampling or offset calibration mode using the buffer reference voltage VREF_AMP. Accordingly, the receiver 2000 of the present invention can perform data sampling or offset calibration with high reliability through a reference voltage of a stable level even in the presence of leakage current $I_L$.

Figure 9:
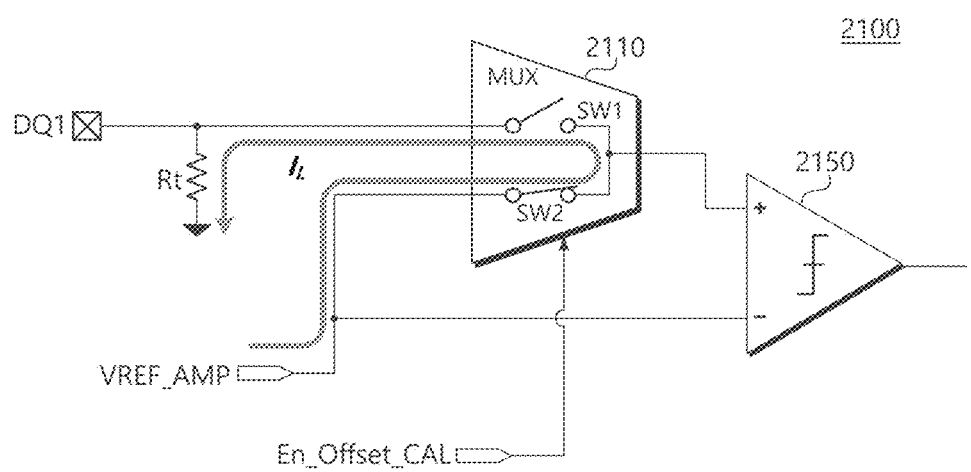
FIG. 9 is a circuit diagram showing a multiplexer and a comparator constituting the data lane of FIG. 8 in more detail.

FIG. 9 is a circuit diagram showing a multiplexer and a comparator constituting the data lane of FIG. 8 in more detail. Referring to FIG. 9, a data lane 2100 includes one multiplexer 2110 and a comparator 2150. Regardless of the mode, the comparator 2150 may sample data or perform an offset calibration operation using only the buffer reference voltage VREF_AMP.

The multiplexer 2110 selects one of the data signal DQ1 and the buffer reference voltage VREF_AMP and transfers it to the positive input terminal (+) of the comparator 2150. To this end, the first multiplexer 1110 may include a first switch SW1 for switching the data signal DQ1 and a second switch SW2 for switching the buffer reference voltage VREF_AMP. In particular, the first switch SW1 may be implemented as a very low threshold voltage SLVT switch or a low threshold voltage LVT switch to switch the high-speed data signal DQ1. In this case, leakage current $I_L$ may exist in the first switch SW1 due to device characteristics even in a turned-off state. Accordingly, when the first switch SW1 is turned off and the second switch SW2 is turned on in the offset calibration mode, a leakage current $I_L$ path may be generated as shown.

However, the buffer reference voltage VREF_AMP is provided through the unity-gain buffer utilizing an operational amplifier. Therefore, even if the leakage current $I_L$ exists, the level of the buffer reference voltage VREF_AMP can be stably supplied.

The comparator 2150 compares the signal provided to the positive input terminal (+) with the signal provided to the negative input terminal (−) in the normal mode. The comparator 2150 outputs a high level 'H' output when the level of the signal provided to the positive input terminal (+) is higher than the level of the signal supplied to the negative input terminal (−). On the other hand, if the level of the signal provided to the positive input terminal (+) is lower than the level of the signal supplied to the negative input terminal (−), the comparator 2150 will output a low level 'L' output. In the offset calibration mode, the comparator 2150 adjusts the difference (or offset) between the signals provided to the positive input terminal (+) and the negative input terminal (−) to a target value (e.g., 0V).

In the data lane 2100 of the present invention, a buffer reference voltage VREF_AMP selected to block the influence of the leakage current $I_L$ can be used regardless of the mode. Since the buffer reference voltage VREF_AMP is generated using the unity-gain buffer, voltage fluctuations due to leakage current $I_L$ can be blocked. Therefore, stable operation of the reference generator 2200 (refer to FIG. 8) can be guaranteed even when leakage current $I_L$ is generated.

Figure 10:
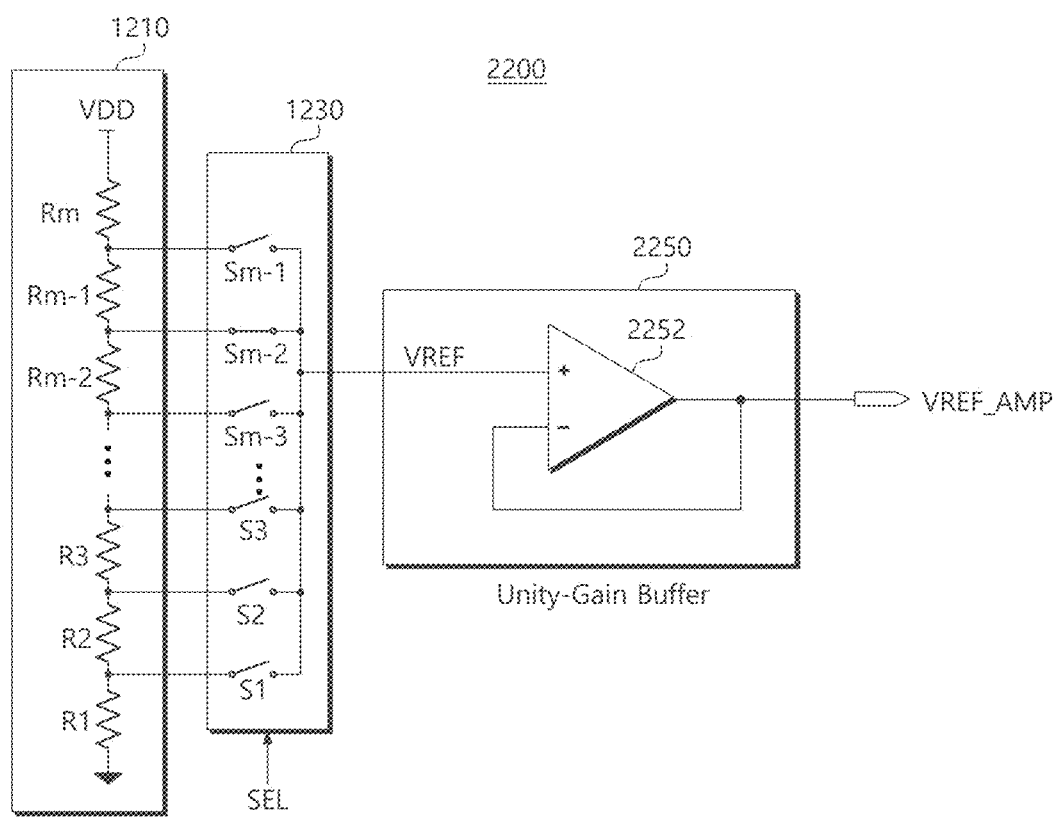
FIG. 10 is a circuit diagram showing the reference generator of FIG. 8.

FIG. 10 is a circuit diagram showing the reference generator of FIG. 8. Referring to FIG. 10, the reference generator 2200 includes a voltage divider resistor 2210, a switch stage 2230, and a unity gain buffer 2250. Here, the characteristics of the voltage divider resistor 2210 and the switch stage 2230 are substantially the same as those of FIG. 3 described above. Therefore, a description of these will be omitted.

The unit gain buffer 2250 generates the reference voltage VREF transmitted from the switch stage 2230 using an operational amplifier 2252 as a voltage follower or unit gain buffer method. That is, the reference voltage VREF is input to the positive input terminal (+) of the operational amplifier 2252, and the buffer reference voltage VREF_AMP output at the same level is negatively fed back to the negative input terminal (−) of the operational amplifier 2252. Therefore, even if the leakage current $I_L$ flows to the output terminal of the buffer reference voltage VREF_AMP, the influence on the positive input terminal (+) of the operational amplifier 2252 can be blocked.

In the above, an example structure of the reference generator 2200 of the present invention has been briefly described. The reference generator 2200 of the present invention uses a unity gain buffer 2250 using an operational amplifier 2252 to generate a buffer reference voltage VREF_AMP. Accordingly, the reference generator 2200 can provide the buffer reference voltage VREF_AMP at a stable level without being affected by leakage current that may occur in the multiplexer 2110 in the offset calibration mode.

Figure 11:
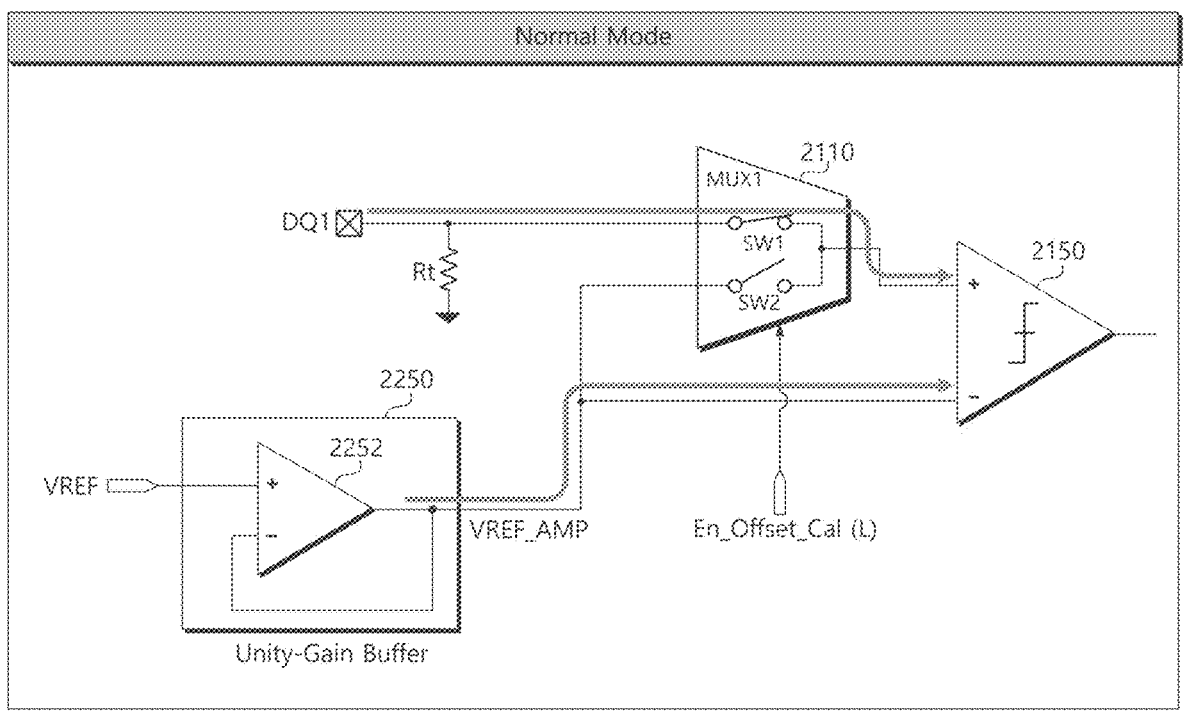
FIG. 11 is a circuit diagram showing a switching state of a multiplexer when a receiver operates in a normal mode according to at least one embodiment of the present invention.

FIG. 11 is a circuit diagram showing a switching state of a multiplexer when a receiver operates in a normal mode according to at least one embodiment of the present invention. Referring to FIG. 11, in normal mode, the multiplexer 2110 transfers the data signal DQ1 and the buffer reference voltage VREF_AMP to the comparator 2150.

The reference generator 2200 generates and supplies the buffer reference voltage VREF_AMP regardless of the mode. The buffer reference voltage VREF_AMP is generated in the form of a voltage follower through the unity gain buffer 2250 of the reference voltage VREF. In the normal mode of receiving the data signal DQ1, the calibration enable signal En_Offset_CAL is deactivated. Then, the first switch SW1 of the multiplexer 2110 is turned on and the second switch SW2 is turned off. As a result, in the normal mode, the data signal DQ1 may be transferred to the positive input terminal (+) of the comparator 2150, and the buffer reference voltage VREF_AMP may be transferred to the negative input terminal (−) of the comparator 2150. Then, the logic value of the data signal DQ1 may be determined by the comparator 2150.

Figure 12:
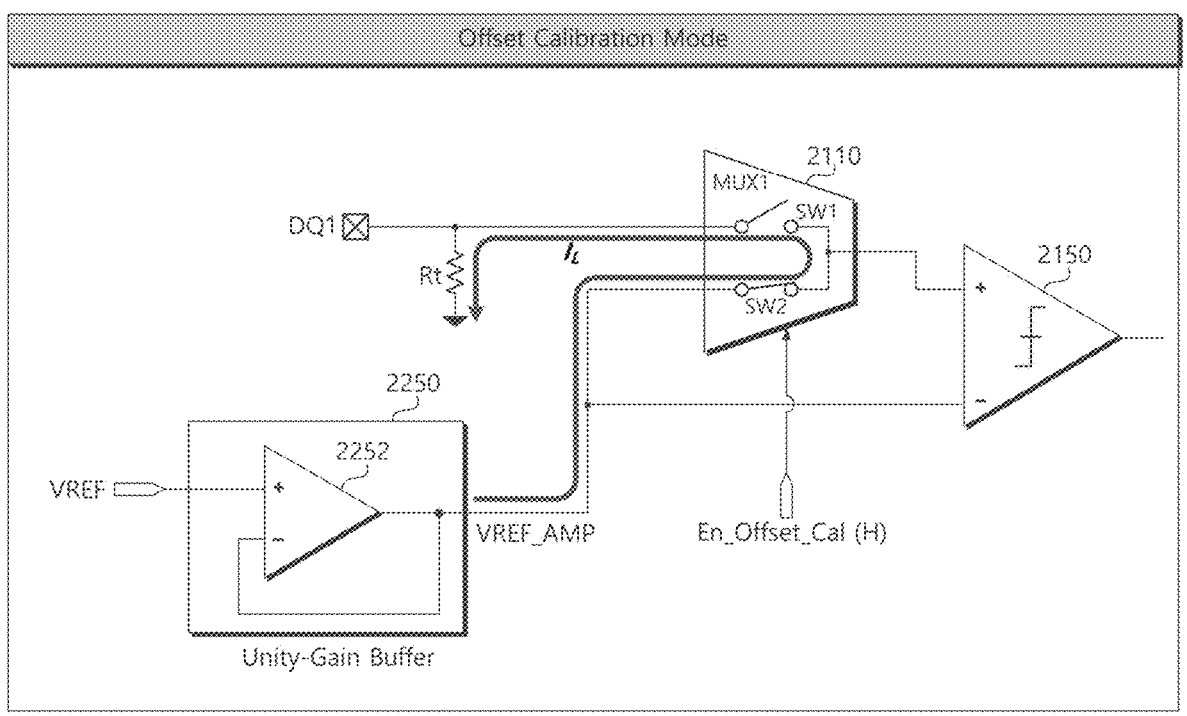
FIG. 12 is a circuit diagram showing switching states of multiplexers in an offset calibration mode of a receiver according to at least one embodiment of the present invention.

FIG. 12 is a circuit diagram showing switching states of multiplexers in an offset calibration mode of a receiver according to at least one embodiment of the present invention. Referring to FIG. 12, in the offset calibration mode, the multiplexer 2110 selects the buffer reference voltage VREF_AMP and transfers it to the comparator 2150.

The reference generator 2200 generates the buffer reference voltage VREF_AMP regardless of the mode. The buffer reference voltage VREF_AMP may be generated through the unity gain buffer 2250. As a result, the unity gain buffer 2250 maintains the buffer reference voltage VREF_AMP and the reference voltage VREF at the same level, but may provide an effect of separating output nodes.

In the offset calibration mode, the calibration enable signal En_Offset_CAL is activated (or 'H'). Then, as shown, the first switch SW1 of the multiplexer 2110 is turned off and the second switch SW2 is turned on. As a result, in the offset calibration mode, the buffer reference voltage VREF_AMP is transmitted to both the positive input terminal (+) and the negative input terminal (−) of the comparator 2150. Then, the offset calibrator 2300 adjusts the offset of the comparator 1150 to an optimal value based on the buffer reference voltage VREF_AMP.

A leakage current $I_L$ may exist in the first switch SW1 even in a turned-off state according to device characteristics. Accordingly, when the first switch SW1 is turned off and the second switch SW2 is turned on in the offset calibration mode, a leakage current $I_L$ path may be formed. However, when the offset calibration mode is applied using the buffer reference voltage VREF_AMP of the present invention, the influence of the leakage current $I_L$ on the reference generator 2200 can be blocked. Since the output terminal of the operational amplifier 2252 is negatively fed back to the negative input terminal (−), the reference voltage VREF can maintain a stable level regardless of the leakage current $I_L$.

The reference generator 2200 of the present invention can stably provide the buffer reference voltage VREF_AMP even in an offset calibration mode by means of the unity gain buffer 2250.

Figure 13:
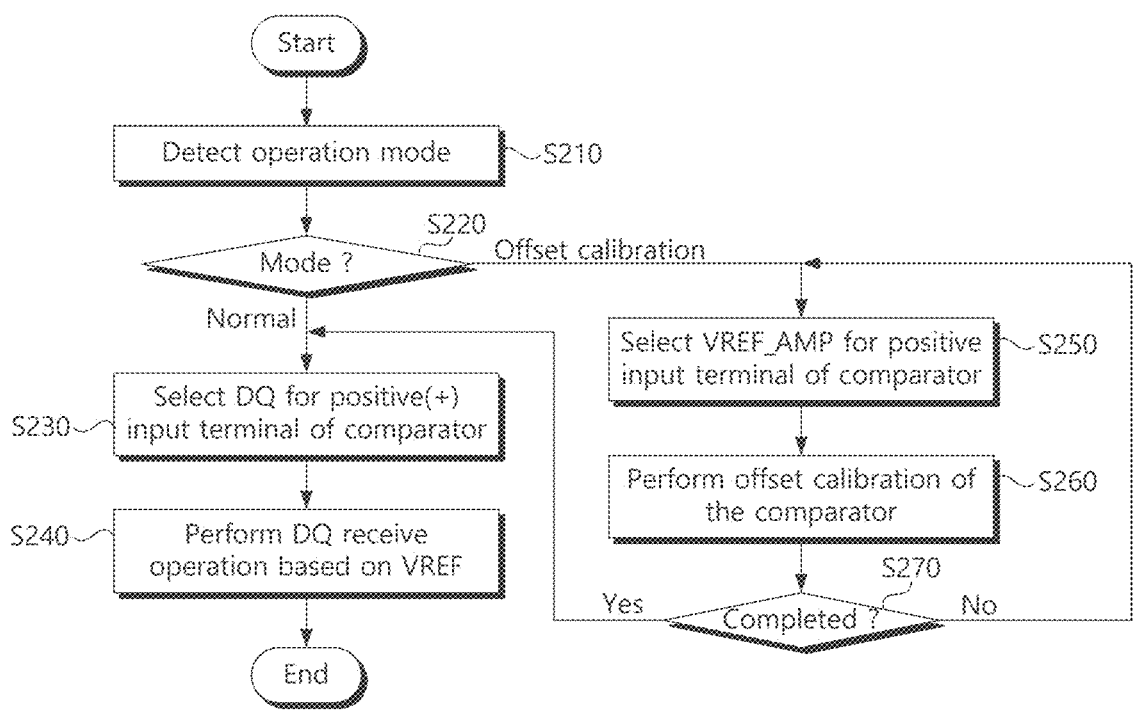
FIG. 13 is a flowchart illustrating operations of a receiver for each mode according to at least one embodiment of the present invention.

FIG. 13 is a flowchart illustrating operations of a receiver for each mode according to at least one embodiment of the present invention. Referring to FIG. 13, the receiver 2000 of the present invention may provide the buffer reference voltage VREF_AMP to the input terminal of the comparator 2150 regardless of the mode.

In step S210, the receiver 2000 checks the operation mode. For example, when the receiver is in an initialization state due to a power-on sequence or reset, the receiver 2000 must apply the offset calibration mode. On the other hand, the operation of receiving the data signal DQj corresponds to the normal mode.

In step S220, an operation branch according to the mode of the receiver 2000 occurs. If in the normal mode, the procedure moves to step S230; and, in case of the offset calibration mode, the procedure moves to step S250.

In step S230, the offset calibrator 2300 deactivates the calibration enable signal En_Offset_CAL to a low level 'L'. At this time, the first switch SW1 of the multiplexer 2110 is turned on, and the second switch SW2 is turned off. Then, the data signal DQ1 is transferred to the positive input terminal (+) of the comparator 2150. The buffer reference voltage VREF_AMP is provided to the negative input terminal (−) of the comparator 1150 regardless of the mode.

In step S240, the comparator 2150 compares the data signal DQ1 input through the positive input terminal (+) with the buffer reference voltage VREF_AMP input through the negative input terminal (−) to determine the logic value of the data signal DQ1.

In step S250, the calibration enable signal En_Offset_CAL is activated to a high level 'H' to execute the offset calibration mode. The first switch SW1 of the multiplexer 2110 is turned off and the second switch SW2 of the multiplexer 2110 is turned on by the calibration enable signal En_Offset_CAL. Then, the buffer reference voltage VREF_AMP is applied to the positive input terminal (+). In addition, the buffer reference voltage VREF_AMP is always provided to the negative input terminal (−) of the comparator 1150. In the offset calibration mode, the buffer reference voltage VREF_AMP is provided to both of the positive input terminal (+) and the negative input terminal (−) of the comparator 2150.

In step S260, the offset calibrator 2300 adjusts the offset of the comparator 2150 to an optimal value based on the buffer reference voltage VREF_AMP. Since the offset calibration procedure by the offset calibrator 2300 is a technical matter outside the features of the present invention, a detailed description thereof will be omitted.

In step S270, the receiver 2000 determines whether the offset calibration mode is completed. If it is determined that the offset calibration mode is completed ('Yes' direction), the process moves to step S230 and the reception operation of the data signal DQ is started. Alternatively, the receiver 2000 may perform another setting mode to be additionally performed after the offset calibration mode. However, if it is determined that the offset calibration mode has not been completed ('No' direction), the procedure moves to step S250 to continue the offset calibration mode.

In the above, the operation method of the multiplexer 2110 and the comparator 1150 according to the operation mode of the receiver 2000 according to at least one embodiment of the present invention has been described. In particular, by executing the offset calibration mode using the buffer reference voltage VREF_AMP, the receiver 2000 can adjust the offset without the influence of leakage current.

Figure 14:
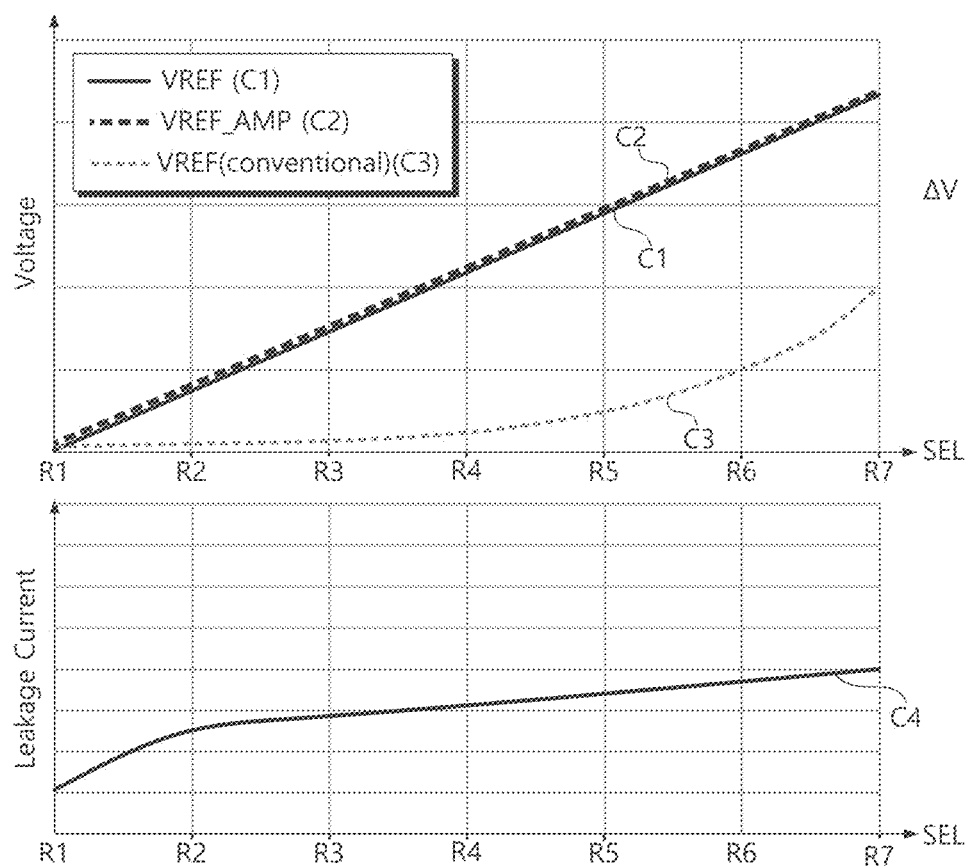
FIG. 14 is a graph showing the effect of the present invention by way of example.

FIG. 14 is a graph showing the effect of the present invention by way of example. Referring to FIG. 14, it is assumed that the receiver 1000 of FIG. 1 uses 8-data lanes and the reference generator 1200 provides both a reference voltage VREF and a buffer reference voltage VREF_AMP.

Curves C1 and C2 show the change of the reference voltage VREF and the buffer reference voltage VREF_AMP according to the selection signal SEL when the buffer reference voltage VREF_AMP is generated using the unity gain buffer 1250 of the present invention. Further, the curve C4 shows the change in the leakage current that increases according to the selection signal SEL. In addition, the curve C3 shows the change in the reference voltage VREF according to the selection signal SEL when the conventional technique of generating only the reference voltage VREF without using the unity gain buffer 1250 is applied.

According to the curves C1 and C2, it can be confirmed that both the buffer reference voltage VREF_AMP and the reference voltage VREF are not affected by the leakage current at all due to the unity gain buffer 1250. For example, it can be seen that both the buffer reference voltage VREF_AMP and the reference voltage VREF increase linearly according to the selection signal SEL. On the other hand, according to the curve C3, it can be confirmed that the linearity of the reference voltage VREF is deteriorated due to the influence of the leakage current.

According to the above characteristics of the present invention, it is expected that a high-speed and high-reliability interface receiver free from the influence of leakage current can be implemented.

The above are specific embodiments for carrying out the present invention. In addition to the above-described embodiments, the present invention may include simple design changes or easily changeable embodiments. In addition, the present invention will include techniques that can be easily modified and implemented using the embodiments. Therefore, the scope of the present invention should not be limited to the above-described embodiments, and should be defined by the claims and equivalents of the claims of the present invention as well as the claims to be described later.

What is claimed is:

1. A receiver of a serial interface, comprising:
   a first multiplexer configured to select one of a data signal or a first reference voltage based on an enable signal;
   a second multiplexer configured to select one of the first reference voltage or a second reference voltage based on the enable signal;
   a comparator including a positive input terminal and a negative input terminal, the comparator configured to receive an output of the first multiplexer through the positive input terminal and an output of the second multiplexer through the negative input terminal; and
   a reference generator configured to generate the second reference voltage and to generate, using a unity gain buffer, the first reference voltage from the second reference voltage,
   wherein the receiver is configured such that when the first multiplexer or the second multiplexer selects the first reference voltage the other of the first multiplexer or the second multiplexer selects the first reference voltage.

2. The receiver of claim 1, wherein the receiver is configured such that, when the enable signal is deactivated, the first multiplexer selects the data signal and the second multiplexer selects the second reference voltage.

3. The receiver of claim 2, wherein the receiver is configured such that, when the enable signal is activated, the first multiplexer and the second multiplexer respectively select the first reference voltage.

4. The receiver of claim 1, wherein the reference generator comprises
   a plurality of resistors connected in series between a power supply voltage and a ground, the plurality of resistors configured to divide the power supply voltage,
   a switch stage configured to select one of the divided power supply voltages based on a selection signal and to transfer the selected divided power supply voltage as the second reference voltage, and
   the unity gain buffer configured to convert the second reference voltage into the first reference voltage.

5. The receiver of claim 4, wherein the unity gain buffer comprises an operational amplifier configured to
   receive the second reference voltage through a positive input terminal of the operational amplifier, and
   receive feedback of the first reference voltage, output from an output terminal of the operational amplifier, through a negative input terminal of the operational amplifier.

6. The receiver of claim 1, wherein the first multiplexer comprises
   a first switch configured to transfer the data signal to the positive input terminal of the comparator based on the enable signal, and
   a second switch configured to transfer the first reference voltage to the positive input terminal of the comparator based on the enable signal,
   wherein one of the first switch or the second switch comprises at least one of a super low threshold voltage switch or a low threshold voltage switch.

7. The receiver of claim 6, wherein the first multiplexer is configured such that, when the enable signal is activated, the first switch is turned off and the second switch is turned on.

8. The receiver of claim 6, wherein the second multiplexer comprises
   a third switch configured to transfer the first reference voltage to the negative input terminal of the comparator based on the enable signal; and
   a fourth switch configured to transfer the second reference voltage to the negative input terminal of the comparator based on the enable signal.

9. The receiver of claim 8, wherein the second multiplexer is configured such that, when the enable signal is activated, the third switch is turned on and the fourth switch is turned off.

10. The receiver of claim 1, further comprising:
    an offset calibrator configured to activate the enable signal according to an operating mode of the receiver.

11. A serial interface receiver, comprising:
    a multiplexer configured to select one of a data signal or a buffer reference voltage based on an enable signal;
    a comparator including a positive input terminal and a negative input terminal, the comparator configured to receive an output of the multiplexer through the positive input terminal and to receive the buffer reference voltage through the negative input terminal; and
    a reference generator configured to generate a reference voltage and to generate, using a unity gain buffer, the buffer reference voltage from a voltage following the reference voltage,
    wherein the receiver is configured such that the multiplexer selects the data signal when the enable signal is inactive, and the multiplexer selects the buffer reference voltage when the enable signal is active.

12. The receiver of claim 11, wherein the reference generator comprises
    a plurality of resistors connected in series between a power supply voltage and a ground, the plurality of resistors configured to divide the power supply voltage,
    a switch stage configured to select one of the divided power supply voltages based on a selection signal and to transfer the selected divided power supply voltage as the reference voltage, and
    the unity gain buffer configured to convert the reference voltage into the buffer reference voltage.

13. The receiver of claim 12, wherein the unity gain buffer comprises an operational amplifier configured to
    receive the reference voltage through a positive input terminal of the operational amplifier, and
    to receive a feedback of the buffer reference voltage, output from an output terminal of the operational amplifier, through a negative input terminal of the operational amplifier.

14. The receiver of claim 11, wherein the multiplexer comprises at least one of a super low threshold voltage switch or a low threshold voltage switch.

15. The receiver of claim 11, further comprising:
    an offset calibrator configured to activate the enable signal according to an operating mode of the receiver.

16. A method for calibrating an offset of a high-speed serial interface receiver, wherein the high-speed serial interface receiver includes a first multiplexer configured to select one of a data signal or a first reference voltage and to provide the selected one of the data signal or the first reference voltage to a positive input terminal of a comparator, a second multiplexer configured to select one of the first reference voltage or a second reference voltage and to provide the selected one of the first reference voltage or the second reference voltage to a negative input terminal of the comparator, and a reference generator configure to provide the first reference voltage and the second reference voltage, the method comprising:

generating at least one of the first reference voltage or the second reference voltage by dividing a power supply voltage;

activating an offset calibration enable signal such that the high-speed serial interface receiver enters an offset calibration mode, and such that the first multiplexer and the second multiplexer both select the first reference voltage in response to the offset calibration enable signal; and performing an offset calibration operation, in which the first reference voltage is supplied to the positive input terminal and the negative input terminal of the comparator.

17. The method of claim 16, further comprising:

deactivating the offset calibration enable signal such that the first multiplexer selects the data signal and the second multiplexer selects the second reference voltage.

18. The method of claim 16, wherein the first multiplexer includes at least one of a super low threshold voltage switch or a low threshold voltage switch.

19. The method of claim 18, further comprising:

using a unity gain buffer to generate the first reference voltage by voltage following the second reference voltage.

* * * * *